United States Patent [19]

Levine

[11] 4,404,587
[45] Sep. 13, 1983

[54] ELECTRICAL COMPENSATION FOR MISREGISTRATION OF STRIPED COLOR FILTER IN A COLOR IMAGER WITH DISCRETE SAMPLING ELEMENTS

[75] Inventor: Peter A. Levine, West Windsor, N.J.

[73] Assignee: RCA Corporation, New York, N.Y.

[21] Appl. No.: 327,594

[22] Filed: Dec. 4, 1981

[51] Int. Cl.³ .............................................. H04N 9/07
[52] U.S. Cl. .................................................... 358/44
[58] Field of Search ............................. 358/43, 44, 51

[56] References Cited

U.S. PATENT DOCUMENTS

| | | | |
|---|---|---|---|
| 4,249,203 | 2/1981 | Yamanaka | 358/50 |
| 4,277,801 | 7/1981 | Rhodes | 358/55 |
| 4,286,285 | 8/1981 | Rhodes | 358/44 |
| 4,288,812 | 9/1981 | Rhodes | 358/44 |
| 4,290,671 | 9/1981 | Rhodes et al. | 350/17 |

*Primary Examiner*—Michael A. Masinick
*Attorney, Agent, or Firm*—Joseph S. Tripoli; Robert L. Troike; Allen LeRoy Limberg

[57] ABSTRACT

Color signal samples generated by CCD imagers used with a color stripe filter normally exhibit hue errors associated with misalignment of the color striped imager on the imager elements, which errors are obtrusive to the viewer of a TV display based on those color signal samples. These hue errors are converted to less-obtrusive color saturation and luminance errors in accordance with the invention, by re-sampling the color signals.

6 Claims, 6 Drawing Figures

ELECTRICAL COMPENSATION FOR MISREGISTRATION OF STRIPED COLOR FILTER IN A COLOR IMAGER WITH DISCRETE SAMPLING ELEMENTS

The present invention relates to imagers, such as CCD imagers, having discrete sampling elements, operated in combination with a striped color filter for generating color signals as may be multiplexed into a color television signal, and, more particularly, to color signal matrixing adjustments to lessen the effects upon the color signals of misregistration of the stripes in the color filter and the columns of discrete sampling elements.

Matrixing adjustments are made per the present invention by resampling the color signal samples to convert the hue errors owing to such misregistration, which errors are intrusively visible to a viewer of the display, to unobtrusive minor color saturation and luminance errors.

Figure 3:
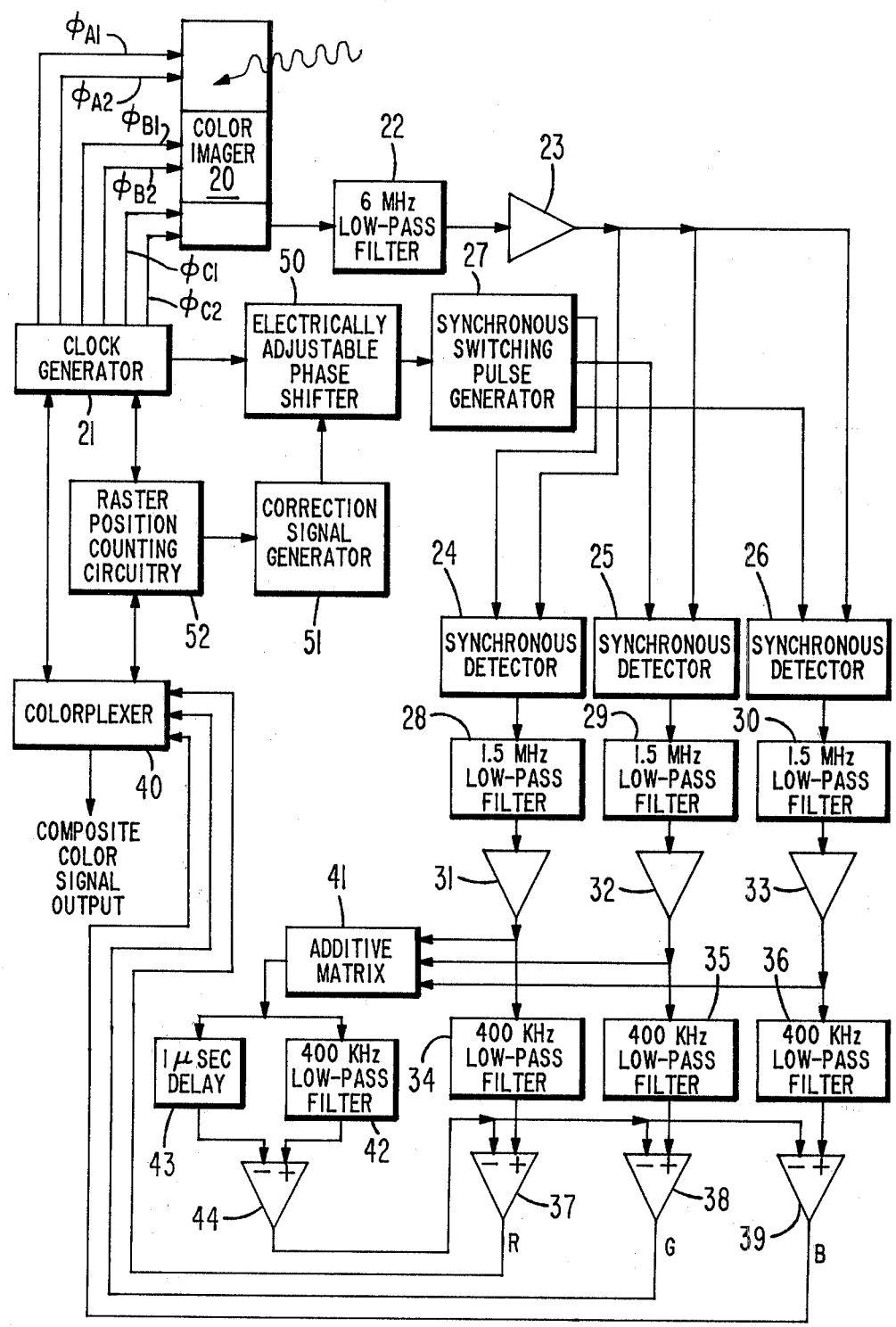
FIG. 3 is a schematic diagram of the combination, in accordance with the present invention, of such a color television camera with electrically adjustable matrixing to transform highly visible hue errors owing to color filter stripe misalignment to relatively unobjectionable color saturation and luminance errors.
Figure 4:
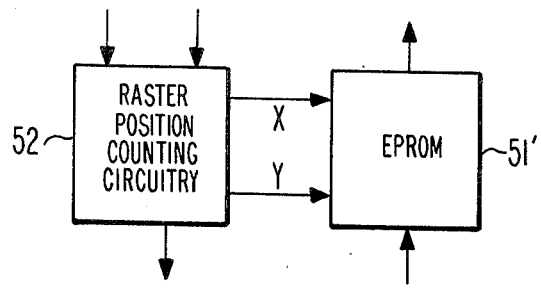
Figure 5:
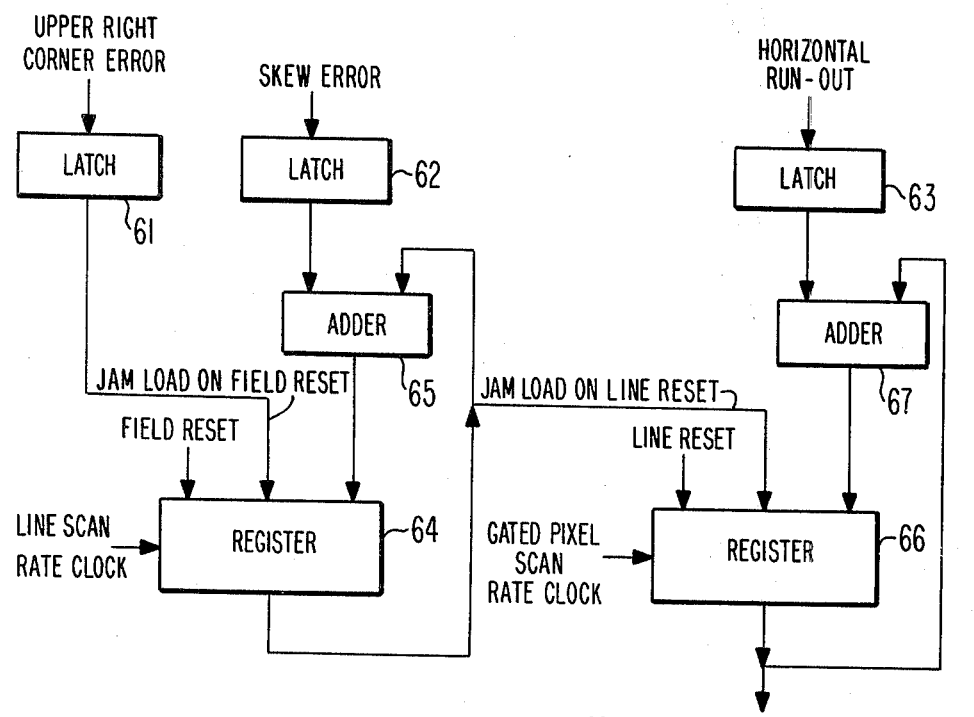
Figure 6:
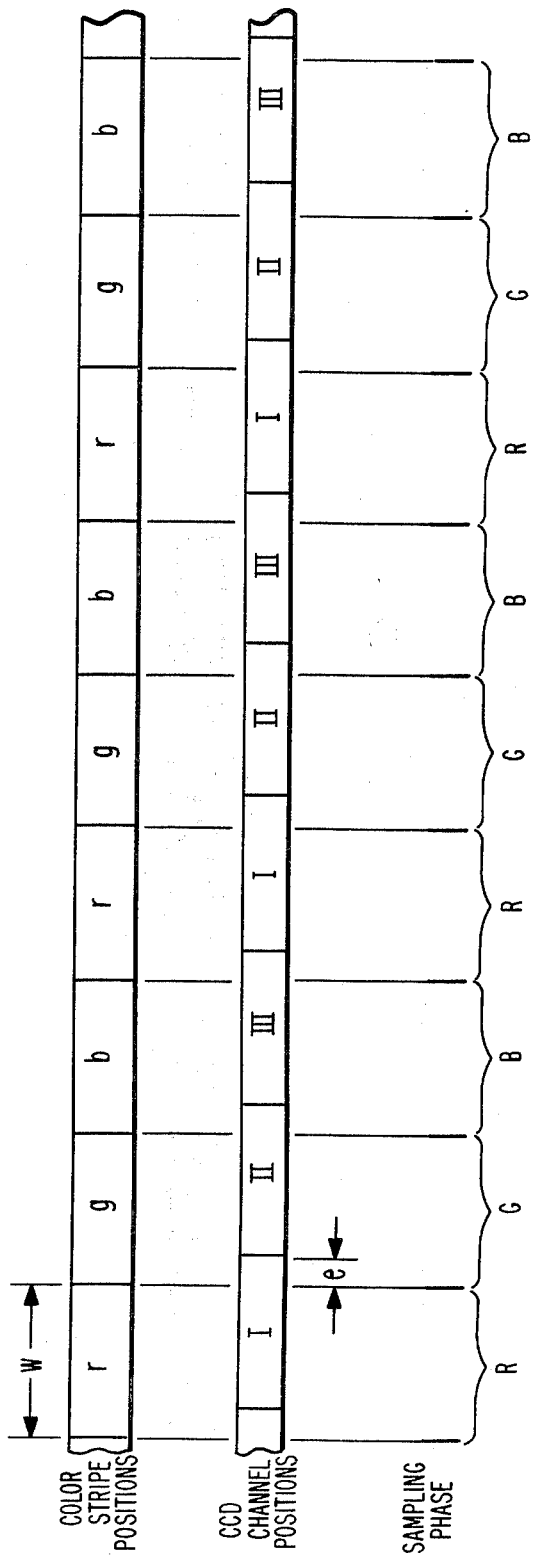

FIGS. 4 and 5 each show portions of specific embodiments of the FIG. 3 combination of apparatus; and FIG. 6 is a diagram of the relative spatial phasing of the color filter stripe positions and the imager columns plotted in parallel with the timing phasing of the synchronous detection samples, which is useful in explaining the working of the invention when the stripes of the color filter are cyclically-red, green and blue.

Figure 1:
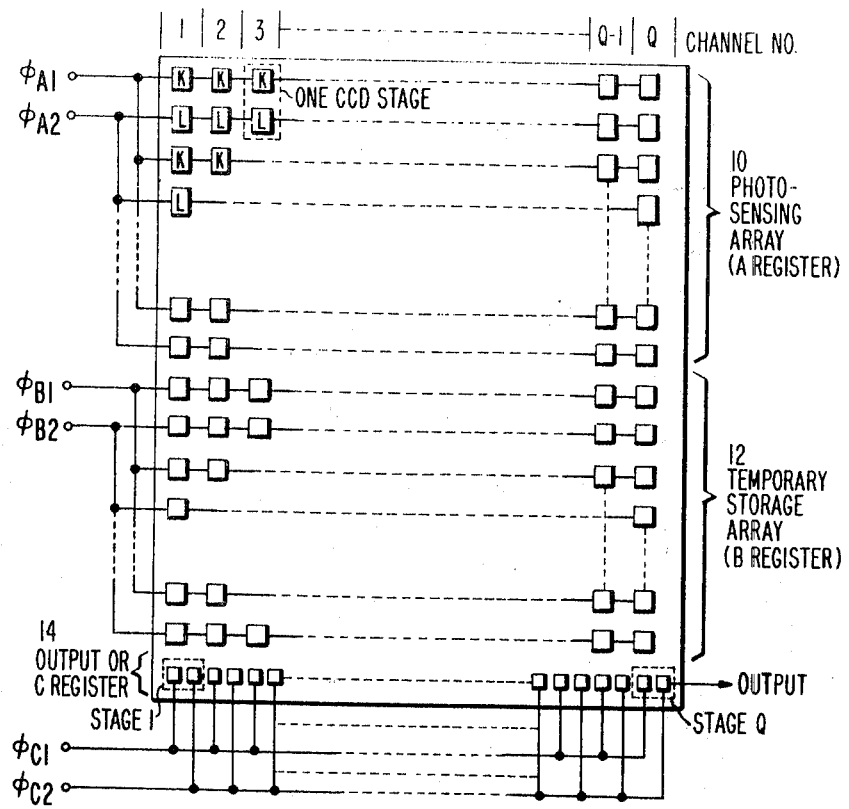
FIG. 1 is a diagram of a prior art CCD imager.

The known system of FIG. 1, a two-phase charge-coupled device (CCD) imager, includes a photosensing array 10, known as an A-register or imaging register, a temporary storage array 12, known as a B-register or field-transfer register, and an output, line-transfer register 14, known as a C-register. The B- and C-registers are masked; i.e., means are provided for preventing a radiant energy image from reaching either register.

The A- and B-registers may have channel stops (not shown explicity) extending in the column direction to isolate the channels (the columns of the CCD) from one another. The electrodes (K and L, per stage) shown schematically, may be any one of the usual overlapped polysilicon, or polysilicon overlapped by metal, or other two-phase structures for insuring unidirectional signal propagation. The imager, while illustrated to be two-phase operated may, of course, be a three or higher phase operated imager instead. One such imager commercially available from RCA Corporation as SID 52501 and known as "Big Sid" employs a single-layer electrode structure, is three-phase operated, and has 320 columns and 512 rows (256 in the A register and 256 in the B register).

The operation of the array of FIG. 1 is well understood. During the so-called integration time, a scene or other image is projected onto the A-register. The light or other radiant energy of the image causes charges to be produced at the various locations of the A-register, in accordance with the light intensity reaching the respective locations.

Upon the completion of the integration time (during the vertical blanking interval of the television signal generated based on the image samples from the imager), the charge signals which have accumulated (a "field") are transferred, in parallel, in the column direction from the A-register to the B-register by the application of the multiple phase voltages $\phi_{A1}$, $\phi_{A2}$, $\phi_{B1}$ and $\phi_{B2}$. During this field transfer time, a shutter may mask the A register to prevent smearing of the image. Alternatively the A-register may remain unmasked and smear reduction techniques as described by P. A. Levine in U.S. Pat. No. 4,010,319 issued Mar. 1, 1977 and entitled "SMEAR REDUCTION IN CCD IMAGERS" may be employed.

The charges subsequently are transferred, a row at a time, from the output stage of the B-register to the C-register. After each row of charges reaches the C-register, it is serially shifted out of the C-register in response to the shift voltages $\phi_{C1}$, $\phi_{C2}$. The serial shifting along the C-register occurs at relatively high speed (during a "line time" of the television signal generated based on the image sampling from the imager). During the transfer of a field from the B-register to the C-register, a new field is integrated in the A-register.

Figure 2:
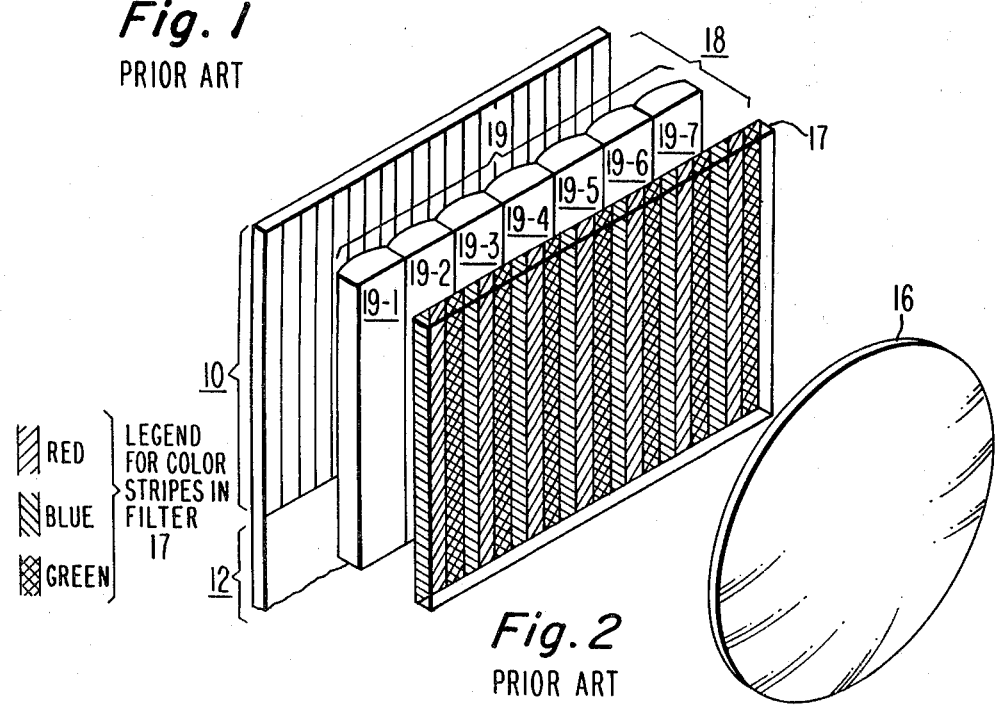
FIG. 2 is a partially exploded view of the optical path arrangement for operating the FIG. 1 CCD imager together with a color stripe filter to form, as known in the prior art, a color television camera.

As illustrated in FIG. 2 such a CCD imager can be adapted for use in a color television camera using an objective lens 16 for focusing the optical image of an object (not shown, but assumed to be below right off-figure) passed through a striped color filter 17 and "relay" optics 18 to fall on the A-register 10 of the CCD imager, so that the stripes of the filtered image are in registration with corresponding columns of A register 10. Elements 16 and 17 are shown in simplified form. A preferred form for the relay optics 18 uses a lenticular array 19 comprising periodic cylindric lenslets, 19-1, 19-2, ... 19-7 as shown in simplified form in FIG. 2 and as more fully described by K. H. Knop in U.S. Pat. application Ser. No. 156,888 filed Jun. 5, 1980 and entitled "SOLID-STATE COLOR-ENCODING TELEVISION CAMERA". The color filter 17 has stripes that are cyclically red, green, and blue or, alternatively, could be cyclically cyan, magenta and yellow. That is, the stripes may be the additive primary colors or the substractive primary colors complementary to the additive primary colors. The stripes are of such widths and orientation that ideally the relay optics 18 images them in superposition over the columns of the CCE imager A-register 10. The projected image of these color stripes for a white field image is shown on the surface of the A-register 10, and ideally each column of the sensing elements should be aligned behind a respective one of the stripes.

The objective lens 16 is a simplified representation of the multiple lens system with zooming capability found in normal color TV cameras. In actuality the color stripe filter 17 is likely to have somewhere around a thousand stripes; and the lenticular lens in the relay optics 18 has many, many more lenslets than shown. The simplifications in FIG. 2 have been made for clarity of illustration. Also the color stripe filter 17, the lenticular lens 19 and the A register 10 are shown in exploded view. The lenticular lens 19 and the color stripe filter 17 are actually very close together, the optical flats they are on usually being cemented together. The resulting composite structure is then mounted next to the A-register 10 of the CCD imager so the image of the filter stripes falls on the register in such a way that adjacent columns of the A-register are illuminated by different colors. It is difficult, however, to obtain perfect registration of the different color stripes with the columns of the A-register 10.

Misregistration of the color stripes with the columns of register 10 causes hue changes across the display screen. Skewing of the stripes will cause hue change from top to bottom of screen, for example. Run-out between the widths of the color stripes and the widths of the A-register 10 columns will cause hue change from side-to-side of screen, as another example. Combinations of these effects may be observed, as well. Until this time, experimenters have expended a great deal of effort trying with less than complete success to eliminate these color-stripe misregistration problems. But during the course of practical manufacture some degree of color-stripe misregistration is likely to be encountered in most of the single-chip color CCD imagers manufactured, so an apparatus for electrically correcting the successive signal samples supplied from output stage Q of C-register 14 in such an imager is of great practical interest.

FIG. 3 shows how the successive samples of the image supplied from the output stage of a color CCD imager 20 are processed to develop a composite color signal. The color CCD imager 20 is shown being supplied clock signals from a clock generator 21. Two phases $\phi_{A1}$ and $\phi_{A2}$ of clock signal, usually of a frequency higher than line frequency, are applied to the A-register of imager 20 during field transfer time, and the two phases of clock signal $\phi_{B1}$ and $\phi_{B2}$ supplied to the B register of imager 20 during field transfer time correspond to $\phi_{A1}$ and $\phi_{A2}$. During integration time, $\phi_{A1}$ and $\phi_{A2}$ clock signals are discontinued, and the $\phi_{B1}$ and $\phi_{B2}$ clock signals are supplied at line advance rate. During each line scan interval the C-register is supplied, at pixel scan rate, two-phase clock signals $\phi_{C1}$ and $\phi_{C2}$. Responsive to them successive red, green and blue samples of the image from the previous integration time are transfered to the output of the C-register and out of the color CCD imager 20. The output from imager 20 is a time-division-multiplexing of red, green, and blue image samples. In a design using the Big Sid imager these samples are supplied at a 6 MHz rate.

The samples are accompanied by switching transients from the C-register clocking, which are suppressed by a low-pass filter 22. To avoid smearing of one color sample into another, this filter has a roll-off frequency close to sample rate, or sampling carrier frequency (6 MHz for the design using Big Sid). This suppresses transients, but affects the phasing of the color samples only slightly, so they may be re-sampled in altered phasing in accordance with the invention. This filtering practice departs from that used in connection with monochromatic CCD imagers, in which the low-pass filter cut-off frequency is well below sampling carrier frequency. The low-pass filter is followed by a buffer amplifier 23, which generally provides voltage gain so the signal as supplied to synchronous detectors 24, 25 and 26 is of sufficient amplitude that noise in the switch elements of the detectors does not contribute appreciably to noise in the detector outputs.

Pulses of the clock frequency associated with the $\phi_{C1}$ and $\phi_{C2}$ phases of C-register clocking are derived from an output of clock generator 21 for circuitry 27 which generates the synchronous switching pulses to control the switches in synchronous detectors 24, 25 and 26.

The pulses of clock frequency are divided into groups of three in circuitry 27. The first pulses of the groups are applied to an input of a de-multiplexer, or synchronous detector, 24 to close a switch and charge a capacitor therein. The second pulses of the groups are applied to an input of a de-multiplexer, or synchronous detector, 25 to close a switch and charge a capacitor therein. And the third pulses of the groups are applied to an input of a de-multiplexer, or synchronous detector, 26 to close a switch and charge a capacitor therein. Accordingly, voltages responsive to successive samples of the red, green, and blue portions of the image appear at the outputs of synchronous detectors 24, 25 and 26, respectively.

These voltages are applied to the inputs of low-pass filters 28, 29, and 30 which have a cut-off frequency below switching carrier frequency in synchronous detectors 24, 25, 26—2 MHz in the design example using Big Sid—by an amount sufficient to adequately suppress aliasing in the synchronous detector 24, 25, 26 R, G, B outputs. Their outputs are shown connected in turn to the inputs of buffer amplifiers 31, 32, and 33.

A system of mixed highs is used to raise the effective image-sampling rate for luminance while suppressing tendencies toward chroma beats. The outputs of buffer amplifiers 31, 32, and 33 are applied to the inputs of low-pass filters 34, 35, and 36, respectively, which separate the lower frequencies portions of these R, G, and B signals for application to the non-inverting inputs of differential-input amplifiers 37, 38, and 39 respectively. The inverting inputs of these differential-input amplifiers are supplied inverted mixed-highs, so R, G, and B signals with mixed highs are supplied from their outputs to the inputs of colorplexer 40 to be combined into a composite color signal. This composite color signal is suitable for modulating a broadcast r-f carrier. The inverted mixed highs are shown as being obtained by adding the output signals from buffer amplifiers 31, 32, and 33 in an additive matrix 41 and filtering the result in a high-pass filter. This high-pass filter is synthesized from a low-pass filter 42 identical to low-pass filters 34, 35, and 36; a delay line 43 providing a matching group delay, and a differential-input amplifier 44 for differentially combining the output response of filter 42 and delay line 43 to signal supplied to their parallelled inputs from the output of additive matrix 41.

Of particular interest in connection with the invention is the fact that there is control of the relative phasing of the sampling rate for samples clocked out of the C-register of color CCD imager 20, on one hand, and, on the other hand, of the submultiple switching carrier frequency applied in the three respective phases to synchronous detectors 24, 25, and 26. Since the output samples from color CCD imager 20 are analog insofar as level is concerned, it is easier to effect the adjustment of this relative phasing by electrically adjusting the phasing of the C-register clock frequency pulses from clock generator 21, which are binary insofar as level is concerned, prior to their application to circuitry 27. Phase adjustment is done prior to circuitry 27 so only one signal need be phase-shifted, rather than three separate submultiple switching carriers from the output of circuitry 27 needing to be phase-shifted. However, the alternative arrangement may be used for realizing other embodiments of the invention.

The shifting of C-register clock frequency is accomplished using an electrically adjustable pulse phase-shifter 50. Such a phase-shifter may, for example, comprise a multiply-tapped delay line (e.g., as provided by a cascade of amplifier stages) and a multiplexer for selecting the tap from which output signal is to be taken per commands from a digital decoder. Alternatively, the C-register clock pulse step transitions may be integrated to ramps and an analog voltage comparator can compare the ramps to the output voltage of a digital-to-analog converter (DAC), for re-timing the step transitions of clock pulses by delay adjustable responsive to digital control signal to the input of the DAC.

A correction signal generator 51 supplies a control input to phase-shifter 50 for each position of raster scan. Assuming the correction signal generator 51 to respond to the Cartesian coordinates of raster scan as defined by a pair of binary numbers, raster position counting circuitry 52 is provided to generate these numbers by counting pulses from the clock generator 21. The counting circuitry used for generating synchronizing signals for composite color signal signal generator 40 may be included in clock generator 21; and, if this be the case, separate raster position counting circuitry 52 will be unnecessary.

Correction signal generator 51 may simply consist of, as shown in FIG. 4, an electrically programmable read-only memory (EPROM) 51' loaded with phase correction information by the color television camera manufacturer. Automatic apparatus can adjust, on a pixel by pixel basis, the phase correction information for best color purity of one of the filter stripe colors while connection of EPROM 51' output to phase shifter 50 input is interrupted, with the adjusted phase-correction information then being loaded into the EPROM 51'.

FIG. 5 shows an alternative way of storing the phase correction information in reduced form. The upper right corner error, the incremental skew error arising from skewing between filter stripes and CCD columns, and the incremental horizontal run-out error arising from disparity in filter-stripe and CCD-column widths are loaded into latches 61, 62, and 63. The phase-correction information for the right edge of the image field is generated at register 64 output. The upper right corner error output of latch 61 is jam-loaded into register 64 at the beginning of the image field, and the skew error is accumulated at the beginning of each line by adding it to the register 64 output in an adder 65 and entering the resultant sum into register 64 to update it. The phase-correction information for any point in the image field is then generated at register 66 output, proceeding from the right edge error jam-loaded into register 66 at the beginning of each line scan of the image. The horizontal run-out error is accumulated at pixel scan rate by adding output from latch 63 to output from register 66 in adder 67, and the output of adder 67 is used to update the contents of register 66, then applied as control signal to adjust the phase shift provided C register clock frequency by phase-shifter 50.

A feeling for why the invention works can be obtained from the following analysis, made with reference to FIG. 6, which shows the relative spatial phasing of the color filter stripe positions and of the CCD imager channel positions for one line of the image register, plotted against the sampling phase of the sampling carrier supplied to synchronous detectors 24, 25, and 26. The widths of the red, green, and blue filter stripes (labelled "r", "g" and "b", respectively) as projected onto the CCD imager channels will be assumed to be of uniform value w, as will be the widths of the CCD imager channels. The CCD channels (recurrently labelled with Roman numerals I, II, and III in cyclical groups of three) are assumed to be of the same uniform width w and to be misregistered respective to the images of the color stripes by an error, e.

When a uniform white field is transmitted to the color CCD imager as optical image, the voltages $V_I$, $V_{II}$, and $V_{III}$ detected in columns I, II, and III of the CCD imager will, from duty cycle considerations, have the following values, where r, g and b would be their values for perfect stripe registration on the CCD imager columns.

$$V_I = [r(w-e)+ge]/w \quad (1)$$

$$V_{II} = [g(w-e)+be]/w \quad (2)$$

$$V_{III} = [b(w-e)+re]/w \quad (3)$$

The sampling phases are presumed to be adjusted to match filter stripe position, so the signals R, G, and B detected during the successive phases will from duty cycle considerations have the following values.

$$R = [V_I(w-3)+V_{III}e]/w \quad (4)$$

$$G = [V_{II}(w-e)+V_Ie]/w \quad (5)$$

$$B = [V_{III}(w-e)+V_{II}e]/w \quad (6)$$

Substituting from equations 1, 2, and 3 into equations 4, 5, and 6 after normalization of stripe width w to unity, one obtains equations 7, 8, and 9 following.

$$R = [r(1-e)^2 + g\,e(1-e)] + [b\,e(1-e)+r\,e^2]$$
$$= r(1-2e) + (g+b)(e-e^2) \quad (7)$$

$$G = g(1-2e) + (b+r)(e-e^2) \quad (8)$$

$$B = b(1-2e) + (r+g)(e-e^2) \quad (9)$$

If e is only a small fraction of unity width w, equations 7, 8, and 9 are closely approximated by equations 10, 11 and 12, following, where $e^2$ terms are dispensed with as being negligibly small.

$$R = r(1-2e)+(g+b)e \quad (10)$$

$$G = g(1-2e)+(b+r)e \quad (11)$$

$$B = b(1-2e)+(r+g)e \quad (12)$$

Equations 10, 11 and 12 may be rewritten as follows.

$$R = r(1-3e)+(r+g+b)e \quad (b\ 13)$$

$$G = g(1-3e)+(r+g+b)e \quad (14)$$

$$B = b(1-3e)+(r+g+b)e \quad (15)$$

Examining these equations for the conditions where the image is a red field, a green field, and a blue field one notes that the R, G, and B signals are each excited to an extent e, which is a small white component, and the one of the color signals corresponding to field color is of additional amplitude (1−3e). That is, the color amplitude is desaturated by 3e and admixed with a white component of amplitude e for any additive primary color field.

The invention wherein sampling phases for synchronous detection are adjusted to match filter stripe position also works when the color stripes are cyclically of the three complementary of "subtractive" primary colors cyan ("c"), magenta ("m"), and yellow ("y"). Synchronous detectors 24, 25 and 26 then detect C, M, and Y signals having the following values, neglecting $e^2$ terms.

$$C = c(1-2e) + (m+y)e \quad (16)$$

$$M = m(1-2e) + (y+c)e \quad (17)$$

$$Y = y(1-2e) + (c+m)e \quad (18)$$

In composite color signal generator 40, as modified to accept complementary color signals as inputs, the R, G and B signals are derived from $C = (G/2) + (B/2)$, $M = (B/2) + (R/2)$, and $Y = (R/2) + (G/2)$ signals by subtracting them from white, the sum of the M, Y, and C signals, in accordance with the following known forumulae.

$$R = M + Y - C \quad (19)$$

$$G = Y + C - M \quad (20)$$

$$B = C + M - Y \quad (21)$$

Substituting equations 16, 17, and 18 into these known formulae, the following values are obtained for the R, G, and B signals.

$$R = (m+y-c)(1-2e) - (2c)e \quad (22)$$

$$G = (y+c-m)(1-2e) - (2m)e \quad (23)$$

$$B = (c+m-y)(1-2e) - (2y)y \quad (24)$$

These equations are rewritten replacing c, m, and y by $(g/2)+(b/2)$, $(b/2)+(r/2)$, and $(r/2)+(g/2)$, respectively, which define them in terms of additive primary colors, to obtain the following.

$$R = r(1-2e) - (g+b)e = r(1-e) - (r+g+b)e \quad (25)$$

$$G = g(1-2e) - (b+r)e = g(1-e) - (r+g+b)e \quad (26)$$

$$B = b(1-2e) - (r+g)e = b(1-e) - (r+g+b)e \quad (27)$$

The error on red, green or blue fields is a negative luminance error and some de-saturation of the color signal corresponding to the field color. Note that the errors are smaller with the color filter 17 stripes being complementaries or subtractive primaries, than they are if the stripes are additive primaries.

It can be illustrated by calculations similar to the foregoing that the invention works no matter what the order of the red, green, and blue or the cyan, magenta, and yellow primary-color stripes in filter 17 or its like.

The invention has been described with synchronous detectors 24, 25, and 26 being of types which detect the base-band components of the red, green, and blue samples. It has application as well when synchronous detectors 24, 25 and 26 include synchronous switching means for transposing the frequency components of these samples which fall in the baseband spectrum with those components falling in a harmonic spectrum. This may be done to suppress response to flicker noise in the output from the CCD imager.

While the invention has been described with respect to a CCD imager of the vertical field transfer type, it has application as well to CCD imagers of other types; e.g., to the line transfer type. In fact, the invention is applicable to any color imager using discrete image sampling elements. It is useful, for example, in an imager where the samples from the discrete image sampling elements are clocked out of the imager using x-y addressing techniques, rather than using CCD shift registers.

What I claim is:

1. A color television camera comprising:
   an imager having discrete sensing elements arrayed in columns and rows;
   a color stripe filter interposed in the optical path to said imager, so its stripes project to respective columns of sensing elements;
   means for deriving from said imager discrete samples of the respective colors of the information imaged on the imager, which samples are subject to errors owing to misregistration of the projected stripes and the columns of sensing elements; and
   means for re-sampling said discrete samples to obtain further color samples with reduced hue error.

2. A color television camera comprising:
   a color stripe filter having stripes that are cyclically ones of a set of primary colors;
   an imager for furnishing successive samples of lines of an optical image from discrete image sampling elements thereof, including
   a raster generator for generating a raster scan for timing those samples;
   optics for imaging an optical image with color stripe filtering on the discrete image sampling elements of said imager so the periodicity of the stripes on each line of image sampling elements substantially corresponds to the periodicity of the successive samples along that line;
   means for synchronously detecting the output signal of said imager in three phases of a sampling carrier with predetermined interleaving;
   means for electrically adjusting the phasing of said sampling carrier phases relative to generated raster scan; and
   correction signal generator means responsive to each point of raster scan for generating an adjustment signal for controlling said means for electrically adjusting the phasing of said sampling carrier phases, said adjustment signal having values such as to reduce hue errors in the synchronously detected imager output signal.

3. A color television camera as set forth in claim 2 wherein said correction signal generator means is a programmable read-only memory storing a value of correction signal for each pair of raster scan coordinates supplied from said raster generator.

4. A color television camera as set forth in claim 2 wherein said correction signal generator includes:
   means for storing an intialization signal;
   means for storing an incremental correction signal;
   accumulator means for accumulating said incremental correction signal at line scan rate to form, at least at selected points of raster scan, said correction signal; and
   means for loading said accumulator means with said initialization signal before reading each successive field of the image from the imager output.

5. A color television camera as set forth in claim 2 wherein said correction signal generator includes:
   means for storing an initialization signal;

means for storing an incremental correction signal;
accumulator means for accumulating said incremental correction signal at pixel scan rate to form, at least at selected points of raster scan, said correction signal; and
means for loading said accumulator means with said initialization signal before reading each successive line of the image from the imager output.

6. A color television camera as set forth in claim 2 wherein said correction signal generator includes:
means for storing first and second values of incremental correction signal;
first accumulator means for accumulating said first value of signal at line scan rate;
second accumulator means for accumulating said second value of signal at pixel scan rate;
means for initializing said first accumulator means to a prescribed value at the beginning of each field; and
means for initializing said second accumulator means to the output of said first accumulator at the beginning of each line, whereby said correction signal is supplied at the output of said second accumulator means.

* * * * *